Oct. 5, 1937.  F. W. YOUNG  2,094,863

FILTER

Filed June 23, 1934

INVENTOR.
FRANK W. YOUNG
BY
ATTORNEY

Patented Oct. 5, 1937

2,094,863

UNITED STATES PATENT OFFICE 2,094,863

FILTER

Frank W. Young, Upper Montclair, N. J., assignor to Oliver United Filters Incorporated, San Francisco, Calif., a corporation of Nevada Application June 23, 1934, Serial No. 732,056

8 Claims. (Cl. 210—202)

This invention relates to filters, and in particular to a mechanism for discharging filters.

Numerous expedients have been resorted to in the past for discharging continuous filters, such as for example scrapers or doctors, couch rolls, lead rolls, suction chambers, and what is known to the trade as a string discharge. A blow back or reverse pressure is used in conjunction with some of these schemes. Each of them is effective in discharging certain types of cakes, although each is subject to certain objections, and cannot be used to discharge all types of cakes.

In general the object of the invention is the provision of a new and novel discharging mechanism, particularly adaptable for the discharge of relatively thin cakes, and which is free from the objections to which some of the past devices have been subject.

More specifically the object of the invention is the provision, in combination with an endless filtering medium on which a cake is continuously deposited, of an endless belt provided with vacuum cups which are arranged or adapted to overlie the cake, and in which vacuum may be created so that upon relative movement of the belt and the filter medium, the cake may be stripped from the filter, and then upon the vacuum being broken, the cake may be released from the belt.

The invention possesses other advantageous features, some of which with the foregoing, will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
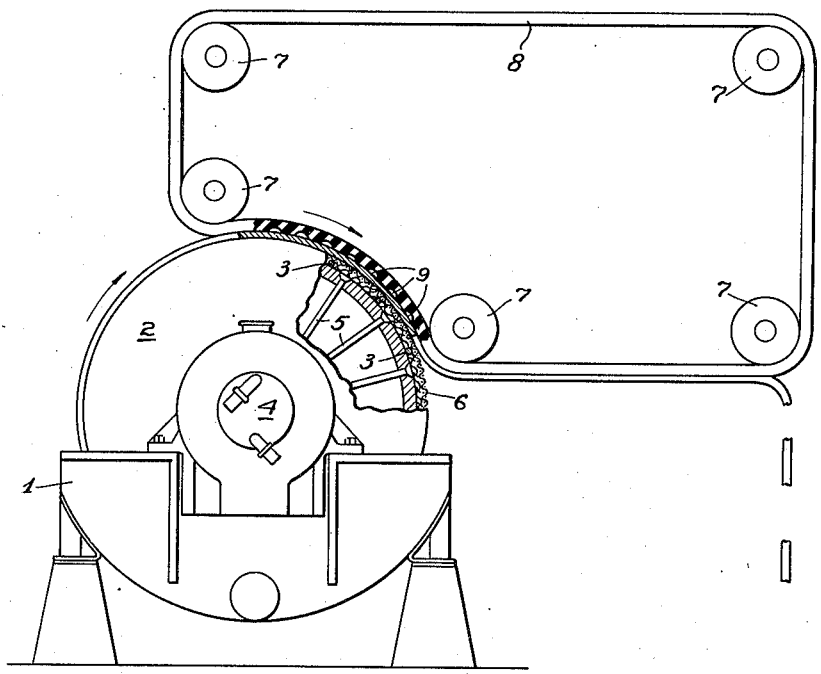
Figure 1 is an end elevation with parts broken away of a continuous rotary drum filter in conjunction with which the objects of the invention have been embodied.

Referring to Figure 1 the discharge belt has been shown in combination with a continuous sectionalized rotary drum filter comprising a tank 1, within which is rotatively mounted a cylindrical drum 2, the outer face of which is formed into longitudinally extending compartments by the usual division strips 3. Each compartment communicates with an automatic valve 4 by means of filtrate pipe 5, and can therefore be successively subjected to the influence of vacuum or to a reverse pressure or blow back as desired. The outer periphery of the drum is covered with any suitable filtering medium 6.

Idler rollers 7 mounted in any suitable framework (not shown) are arranged to carry a discharge belt 8 in such a manner that the belt is made to contact or overlie the cake deposited on the drum during the discharge period. Inasmuch as the belt 8 must be driven in synchronism with the drum 2 it is preferably driven by frictional contact or engagement with the drum or cake, but if desired, means may be provided for positively driving the belt 8 so long as care is taken to drive the belt in synchronism with the drum.

Figure 2:
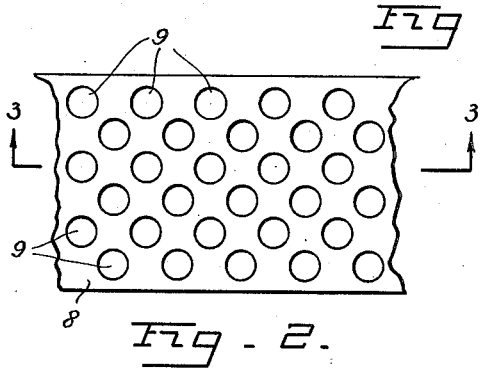
Figure 2 is a plan view of a portion of a discharge belt showing the disposition of the vacuum cups on its outer surface.
Figure 3:
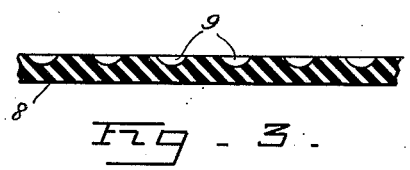
Figure 3 is a section taken on the line 3—3 of Figure 2.

As shown in Figures 2 and 3 the discharge belt 8 is provided on its outer surface with a plurality of vacuum cups 9.

Figure 4:
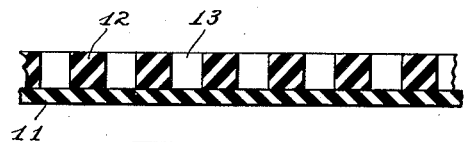
Figure 4 is a section taken through a composite belt.

In Figure 4 a modified form of belt has been shown comprising two layers of material 11 and 12 cemented or otherwise secured together. The layer 12 is provided with cylindrical vacuum cups 13 which are relatively deep as compared with the depth of the cups 9 formed in the belt 8 as shown in Figures 2 and 3. The purpose of this additional depth is to increase the capacity of the vacuum cups to thereby minimize the loss in vacuum due to leakage between the engaging faces of the cake and the discharge belt.

Figure 5:
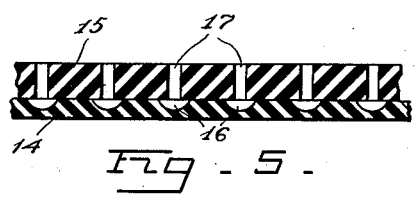
Figure 5 is a section taken through a composite belt of modified form.

Another method of increasing the capacity of the vacuum cups has been shown in Figure 5. For purposes of construction this type of belt like the belt shown in Figure 4 is a composite belt made of two layers 14 and 15 cemented or otherwise secured together. The layer 14 is provided with a plurality of concave recesses 16, while the upper layer 15 is provided with cylindrical apertures 17 of smaller diameter than the recesses 16 and adapted to register with said concave recesses. In this modification the concave recesses 16 together with the opening 17 may together be considered as forming the vacuum cups. It is to be noted that when so constructed the mouths of the vacuum cups are restricted in comparison with the mouths of the vacuum cups 9 and 13 as shown in Figures 2, 3 and 4. Since leakage into the vacuum cups depends upon the size of the mouths of the vacuum cups it will be appreciated that by the construction shown in Figure 5 the capacity of the vacuum cups has been increased without increasing the chances of leakage around the mouths of the cups.

The belt shown in each of the figures should be made of an impervious material such as for example, rubber, and when it is desired to use this type of discharge in combination with a rotary drum filter, the material from which the belt is made should be flexible as well as impervious.

In the operation of the device as shown in Figure 1 a cake is formed on the periphery of the drum 2 under the influence of vacuum and the vacuum is maintained until the cake is actually discharged. When the cake is engaged by the belt 8 a partial vacuum is created within the vacuum cups of the belt. This is made possible due to the fact that the cake is more or less porous thereby permitting the air within the cups to pass through the cake and into the filter compartments. Just prior to the point at which the belt 8 and the filter drum are made to diverge the lower side of the cake is subjected either to atmospheric pressure or to a super atmospheric pressure by means of the automatic valve 4. The cake is therefore stripped from the drum and held to the discharge belt when the belt and drum are made to diverge, and the cake is held to the belt until the partial vacuum within the vacuum cup is broken, such as for example by being guided over a roll of relatively small diameter. If the cake is of a porous nature such as paper pulp there will be a leakage of air through the cake and as a consequence the pressure within the vacuum cups will rise to atmospheric pressure soon after the cake is stripped from the drum. In some instances the cups in the belt serve to hold the cake not by virtue of the partial vacuum created, but due to the fact that the cake is partially impressed within the cups, and is retained therein by the pinching action at the mouths of the cups.

I claim:

1. In combination with a filter having a cake deposited thereon; an impervious sheet of material provided with vacuum cups adapted to overlie said cake; means for creating a vacuum within said cups while said cups are overlying the cake and means for effecting relative motion between said sheet of material and the filter to thereby strip the cake from the filter.

2. In combination with a filter having a cake deposited thereon; an impervious sheet of material provided with vacuum cups adapted to overlie said cake; means for creating a vacuum within said cups while said cups are overlying the cake; means for effecting relative motion between the sheet of material and the filter to thereby strip the cake from the filter and means for breaking the vacuum within said cups.

3. In combination with a filter having a cake deposited thereon; an endless band provided with vacuum cups adapted to overlie said cake; means for effecting a vacuum within said cups while said cups are overlying said cake; and means for moving said band relative to said filter.

4. In combination with a continuous filter on which a cake is being continuously deposited; an endless traveling band a portion of which is continuously made to overlie a portion of said cake; vacuum cups formed on the surface of said band which contacts with the cake; and means for creating a vacuum within the cups overlying the cake.

5. In combination with a continuous rotary drum filter on which a cake is continuously deposited; an endless band provided on its outer face with vacuum cups; a set of idler rolls for causing said band to contact the cake formed on the filter; and means for creating a vacuum within the vacuum cups in contact with the cake.

6. A discharging mechanism for rotary drum filters comprising a sheet of impervious material provided on one face with a plurality of vacuum cups, the mouths of said cups being relatively restricted.

7. A discharge mechanism for continuous filters comprising an impervious belt provided on one face with a plurality of vacuum cups; and a second impervious belt overlying said first belt and provided with apertures adapted to register with said vacuum cups.

8. In combination with a filter having a cake deposited thereon; an impervious sheet of material provided with vacuum retaining means adapted to overlie said cake; means for creating a vacuum therein while said sheet or belt is overlying the cake and means for effecting relative motion between said sheet of material and the filter to thereby strip the cake from the filter.

FRANK W. YOUNG.